United States Patent [19]
Mills et al.

[11] 3,842,879
[45] Oct. 22, 1974

[54] PNEUMATIC TIRES

[75] Inventors: Anthony Mark Mills, Sutton Coldfield; William Wortley, Erdington; Grahame John Barton, Curdworth, all of England

[73] Assignee: Dunlop Holdings Limited, London, England

[22] Filed: Nov. 7, 1972

[21] Appl. No.: 304,399

Related U.S. Application Data

[63] Continuation of Ser. No. 110,974, Jan. 29, 1971, abandoned.

[52] U.S. Cl. .......................................... 152/209 R
[51] Int. Cl. ............................................ B60c 11/06
[58] Field of Search ..................... 152/209 R, 209 D

[56] References Cited
UNITED STATES PATENTS

| | | | |
|---|---|---|---|
| 2,180,649 | 11/1939 | White | 152/209 R |
| 3,217,776 | 11/1965 | Ellenrieder et al. | 152/209 R |
| 3,559,712 | 2/1971 | Verdier | 152/209 R |

*Primary Examiner*—James B. Marbert
*Attorney, Agent, or Firm*—Stevens, Davis, Miller & Mosher

[57] ABSTRACT

A tire, particularly one for a motor-cycle, the tread of which comprises a plurality of blocks having circumferential edge lengths, transverse edge lengths and depths which are respectively longer, shorter and smaller for blocks nearer the tire shoulder than the tire crown or which respectively increase, decrease and decrease the further the block is from the tire mid-circumferential plane.

13 Claims, 2 Drawing Figures

PATENTED OCT 22 1974  3,842,879

PNEUMATIC TIRES

This is a continuation of application Ser. No. 110,974, filed Jan. 29, 1971, now abandoned.

This invention relates to pneumatic tire and more particularly to motor cycle tire especially those for travelling across soft ground.

In accordance with the invention there is provided a pneumatic tire having a tread comprising a plurality of spaced-apart ground-contacting blocks, the blocks provided at or adjacent the tread crown region having a longer transverse ground-contacting surface dimension edge length or projected length, a shorter circumferential ground-contacting surface dimension edge length or projected length and a greater depth, measured from the ground-contacting surface of the blocks to the local radially outermost surface of the tyre carcass, than the blocks at or closest to the treat shoulder region.

Preferably the blocks are provided in all regions of the tread.

In accordance with a further aspect of the invention there is provided a pneumatic tire having a tread comprising a plurality of spaced-apart ground-contacting blocks the circumferential ground-contacting dimension edge length or projected length of each block, the transverse ground-contacting dimension edge length or projected length of each block and the depth of each block, measured from the ground-contacting surface of the block to the local radially outermost surface of the tire carcass, is respectively longer, shorter and smaller the greater the transverse distance of the axially innermost part of the ground-contacting surface of the block from the mid-circumferential plane of the tire.

Throughout this specification and claims the phrase "axially innermost" means nearest to the mid-circumferential plane of the tire. Conversely the phrase "axially outermost" means furthest from the mid-circumferential plane. "Dimension" means the greatest ground contacting length on a ground contacting block, or projected length thereof, said length or dimension being measured either transverse to (across) the tread, or circumferentially, parallel to the tire circumference.

Preferably the blocks are disposed in staggered arrangement in rows which are transverse or inclined to a tire circumference, the blocks in one row being opposite gaps in the two immediately adjacent rows except at the ends of alternate rows. The transversely-extending grooves formed between transverse rows of blocks are relatively wide so as to provide for adequate sideways clearance of soil picked up by the tread and it is preferred that the width in a circumferential direction of these grooves at any given part thereof is at least as wide as the circumferential ground-contacting surface edge length or projected length of the blocks provided adjacent the given part of the grooves for at least a proportion, preferably a major proportion of the groove length.

Two embodiments of the invention, 4.60 × 18 size racing motor cycle tire suitable for use on soft ground will now be described by way of example with reference to the accompanying drawings of which:

Figure 2:
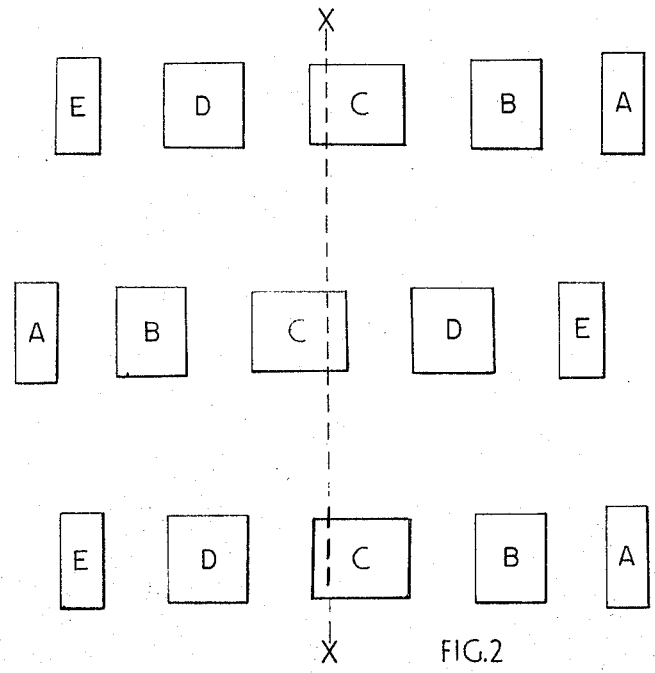
FIG. 2 is a representation of the tread block arrangement of the tire shown in FIG. 1, the block surfaces being shown in a position they would occupy if the surface of the tire without the blocks were flat.

It is to be noted that while the relative dimensions of the blocks as shown in FIG. 2 are correct, the distances between the blocks, will be distorted. In particular the circumferential spacing between the blocks near the tire shoulder will be reduced on account of the reduced circumference of the tread shoulder compared with the tread crown.

The first tire 1 comprises a tread having a plurality of blocks (A,B,...) each having a rectangular ground-contacting surface 2, two edges of the surface extending circumferentially and the other two transversely, i.e., at right-angles to the circumferential edges. The tire also comprises a layer 3 of under-block rubber of substantially uniform thickness of 4mm. surrounding the radially outermost surface 6 of the tire carcass 7 and extending from one lower sidewall 4 to the other 5.

The blocks are arranged in rows extending transversely of the tread, five blocks A, B, C, D and E to a row, in a staggered arrangement wherein the rows of blocks are displaced alternately towards one side of the tire and the other so that each block is adjacent a gap between blocks in the two immediately adjacent rows except for the block at the laterally outermost end of each row.

Each row of blocks is the same in respect of dimensions and relative locations except that alternate rows are reversed. Thus the blocks nearest one side of the tire tyre are A, E, A, E and on the other are E, A, E, A. Block A is nearer to its associated bead region than is block E.

All blocks are of rectangular form having two circumferentially-extending edges and two transverse edges the lengths of which respectively increase and decrease the further the axially-inner edge of the block is from the mid-circumferential plane of the tire. The center block in each row straddles the tire mid-circumferential plane X—X asymmetrically.

The lengths in millimeters of the sides of the blocks at their ground-contacting surfaces, the distances, also in millimeters their axially inner edges would be from the tire mid-circumferential plane if the surface of the tire with the blocks removed were flattened out and the block depths measured between the center of the block ground-contacting surface and the radially outermost extremity of the under block rubber are given in the Table I below.

TABLE I

| Block | A | B | C | D | E |
|---|---|---|---|---|---|
| Circumferentially-extending edge | 24 | 21 | 20 | 22.5 | 25 |
| Transverse edge | 10.5 | 20 | 24.5 | 17.5 | 10.5 |
| Distance of axially innermost edge from mid-circumferential plane | 58 | 21.5 | 4.5 | 37 | 69.5 |
| Depth | 10 | 12 | 14 | 13 | 11 |

It should be noted that block C, the center block in each row, straddles the mid-circumferential plane and is disposed such that 4.5 mm. of the transverse edge are disposed on one side of the mid-circumferential plane while 20 mm. are disposed on the other side. Thus block C is the closest block to the mid-circumferential plane of the tire and has the shortest circumferentially extending edges, the longest transverse edges and the greatest depth.

Figure 1:
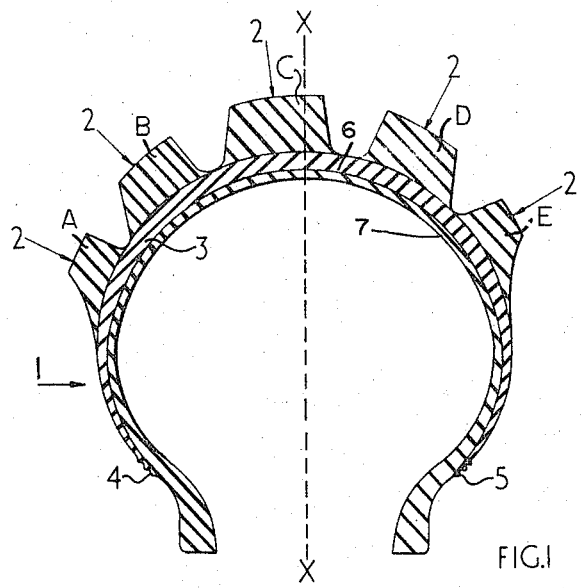
FIG. 1 is an axial cross-section through the tire of the first embodiment.

In addition, as can be seen from FIG. 1, the depth of blocks A, B, D and E are not constant across their transverse lengths, the difference between depths measured at the axially outer edge is approximately 1 mm.. The transverse edge lengths of blocks A and E are the same i.e., 10.5 mm.. Alternatively the transverse lengths of blocks A may be increased e.g. to 12 or 13 mm..

As can be seen from the table above, no two blocks in a row have the same overall dimensions and for each row the blocks on each side of the mid-circumferential plane the lengths of the circumferentially-extending edges, the lengths of the transversely extending edges and the depths respectively increase, decrease and decrease with increase in the distance of the axially inner edge of the block from the tire mid-circumferential plane. In addition the lengths of the circumferentially extending edges, the lengths of the transversely extending edges and the depths of blocks A and E (the blocks closest adjacent the tread shoulder) are respectively longer, shorter and smaller than the corresponding dimensions of block C (the block in the tread crown region).

The second tire is very similar to the first in that it comprises a tread having a plurality of blocks arranged in staggered rows of five blocks per row. The difference between the two tire is caused by the fact that in the first tire blocks A and E, and blocks B and D are dissimilar while in this second tire blocks A and E and blocks B and D are similar. Thus in the second tire each row of blocks is symmetrical about the center of the centre block C whereas in the first tire no such symmetry exists.

The various dimensions (in mm.) of the blocks of the second tire are given in Table II below.

TABLE II

| Block | A | B | C | D | E |
|---|---|---|---|---|---|
| Circumferentially-extending edge | 24 | 22 | 20 | 22 | 24 |
| Transverse edge | 13 | 19 | 24 | 19 | 13 |
| Distance of axially innermost edge from mid-circumferential plane | 55 | 22 | 5 | 36 | 67.5 |
| Depth | 10 | 11 | 13 | 11 | 10 |

Block C, the center block in each row straddles the tire mid-circumferential plane and is disposed so that 5 mm. of the transverse edge are disposed on one side of the mid-circumferential plane while 19 mm. are disposed on the other.

In addition, the depths of blocks A, B, D and E are not constant across their transverse lengths, the difference between depths measured at the axially outer and innermost edge is approximately 1 mm.

The circumferential width of the transverse grooves formed between rows of blocks of both tire is such that the circumferential distance between blocks in the mid-circumferential plane of the tire is 36 mm. and between blocks adjacent the tire shoulder is 22 mm.. This latter distance appears enlarged in FIG. 2 due to the effect of the difference in circumference at the tread shoulder and tread crown. The width of the groove at most parts thereof, the exception being that part between shoulder blocks, is therefore wider than the transverse edge length of the blocks bounding the groove.

In use of these tire during movement in a forward direction and during braking in a forward direction the blocks nearer the crown region of each tire are those which are in use and which are in the contact patch. The longer transverse edges of these blocks provide for increased traction during this type of movement.

As the motor cycle leans further over during cornering the tendency for the tire to skid or slip sideways increases and the blocks nearer or at the shoulder of the tire enter the contact patch. The relatively longer circumferential edges of these blocks provide increased grip to prevent skidding or slipping during cornering. Since the area of the contact patch during cornering is less than the contact patch during forward running or braking the load on an individual shoulder block is much increased compared to that on a crown block. The depth of rubber in the shoulder blocks is therefore made less than that of the rubber in the center block thereby increasing stability of the shoulder blocks and so prevent them being distorted sideways.

The combination of different size blocks as just described give advantageous properties to the tire in all types of movement thereof, and the staggered arrangement of rows of equal members of blocks results in longer traction edge length in the contact patch, than a tire in which the rows contain alternately different numbers of blocks e.g. 4 and 5, in staggered arrangement.

Having now described out invention, what we claim is:

1. A pneumatic tire having a tread comprising a plurality of spaced-apart ground-contacting blocks, the blocks nearer the tread crown region having a longer transverse ground-contacting dimension a shorter circumferential ground-contacting dimension and a greater depth, measured from the ground-contacting surface of the blocks to the radially outermost surface of the tire carcass, than the blocks closer to the tread shoulder region.

2. A pneumatic tire according to claim 1 wherein the blocks are provided in all regions of the tread.

3. A pneumatic tire having a tread comprising a plurality of spaced-apart ground-contacting blocks, the circumferential ground-contacting dimension of each block, the transverse ground-contacting dimension of each block, and the depth of each block, measured from the ground-contacting surface of the block to the radially outermost surface of the tire carcass, are respectively longer, shorter and smaller, the greater the transverse distance of the axially innermost part of the ground-contacting surface of the block from the mid-circumferential plane of the tire.

4. A pneumatic tire according to claim 1 wherein each block has a rectangular ground-contacting surface.

5. A pneumatic tire according to claim 4 wherein two of the block edges extend circumferentially of the tire.

6. A pneumatic tire according to claim 1 wherein the blocks are disposed in rows.

7. A pneumatic tire according to claim 6 wherein the rows are transverse to the tire mid-circumferential plane.

8. A pneumatic tire according to claim 7 wherein the transverse grooves formed between transverse rows each have a width in a circumferential direction which is at least as wide as the circumferential ground-contacting dimension of the blocks provided adjacent the given part of the grooves for at least a portion of the groove length.

9. A pneumatic tire according to claim 6 wherein the rows are inclined to the tire mid-circumferential plane.

10. A pneumatic tire according to claim 6 wherein the blocks are disposed in staggered arrangement, the blocks in one row being opposite gaps in the immediately adjacent rows except at the laterally outermost end of each row.

11. A pneumatic tire according to claim 6 wherein the rows consist of equal number of blocks.

12. A pneumatic tire according to claim 6 wherein in each row there is a block having the same dimensions as a block in the next row.

13. A pneumatic tire according to claim 6 wherein in each row no two blocks have the same dimensions.

* * * * *